United States Patent [19]

Ishihara et al.

[11] 4,192,276

[45] Mar. 11, 1980

[54] SAFETY ARRANGEMENT IN KICKSTART APPARATUS FOR AN INTERNAL COMBUSTION ENGINE

[75] Inventors: Takeo Ishihara; Seishi Miura, both of Asaka, Japan

[73] Assignee: Honda Giken Kogyo Kabushiki Kaisha, Tokyo, Japan

[21] Appl. No.: 878,379

[22] Filed: Feb. 16, 1978

[30] Foreign Application Priority Data

Feb. 25, 1977 [JP] Japan ............................ 52-21331[U]

[51] Int. Cl.$^2$ ........................ F02N 17/00; B60K 41/08

[52] U.S. Cl. .................................. 123/179 K; 74/850

[58] Field of Search ......... 123/179 SE, 179 K, 179 S, 123/179 T; 74/850; 180/33 B, 33 C, 82 A

[56] References Cited

U.S. PATENT DOCUMENTS

| | | | |
|---|---|---|---|
| 2,077,628 | 4/1937 | Jordan | 180/33 B |
| 3,518,979 | 7/1970 | Harkness | 123/179 K |
| 3,830,110 | 8/1974 | Suzuki | 123/179 SE |
| 3,958,398 | 5/1976 | Fuelling, Jr. | 123/179 K |
| 4,067,243 | 1/1978 | Kurata et al. | 123/179 S |

*Primary Examiner*—Charles J. Myhre
*Assistant Examiner*—Magdalen Moy
*Attorney, Agent, or Firm*—Haseltine, Lake & Waters

[57] ABSTRACT

A safety arrangement in a kickstart apparatus for an internal combustion engine in which the starting of the engine is limited to the condition that the transmission only be in neutral. A drive gear mounted on the crank shaft of the engine is connected to the input side of the transmission and a starting gear operated by a kick pedal is connected to the driving gear through a clutch having a movable half portion and a stationary half portion. A claw is engageable with the movable half portion to arrest the same and a detector detects the position of a shift drum which shifts the transmission in order to selectively engage the claw with the movable half portion of the clutch when the transmission is in any position other than neutral.

4 Claims, 3 Drawing Figures

SAFETY ARRANGEMENT IN KICKSTART APPARATUS FOR AN INTERNAL COMBUSTION ENGINE

FIELD OF THE INVENTION

The invention relates to a safety arrangement in a kickstart apparatus for an internal combustion engine particularly for a vehicle, such as a motorcycle or the like.

PRIOR ART

Kickstart apparatus of this type has been known in which a driving gear mounted on a crank shaft of an internal combustion engine is connected to a driving shaft at the input side of a transmission, which is shiftable between at least three stages inclusive of high speed, low speed and neutral by rotation of a shift drum, the driving gear also being connected in parallel to a starting gear mounted on a starting shaft having a kick pedal at its end, the starting gear and the starting shaft being interconnected through a clutch comprising a movable half portion and a stationary half portion which are arranged to be engaged by turning of the starting shaft. This conventional arrangement, however, is deficient in that, at the time of operation of the kick pedal, the transmission must be changed over to the neutral stage, and if not, it is unavoidable, in the case of a vehicle such as a motorcycle or the like, the vehicle can undergo unintentional starting in gear which involves great danger.

SUMMARY OF THE INVENTION

An object of the invention is to provide an improvement in which the starting of the engine can only be effected when the transmission is in neutral.

This is achieved in accordance with the invention by the provision of an engaging claw means which is engageable with the movable half portion of the clutch means to arrest the same and a detecting means for detecting the positions of the shift drum corresponding to the stages of the transmission for selectively moving the claw means into engagement and disengagement with the movable half portion of the clutch means.

More specifically, the detecting means moves the claw means into engagement with the movable half portion when the transmission is in any position other than neutral. Hence, the movable half portion of the clutch means can be engaged with the stationary half portion of the clutch means only when the transmission is in neutral.

DETAILED DESCRIPTION

Figure 1:
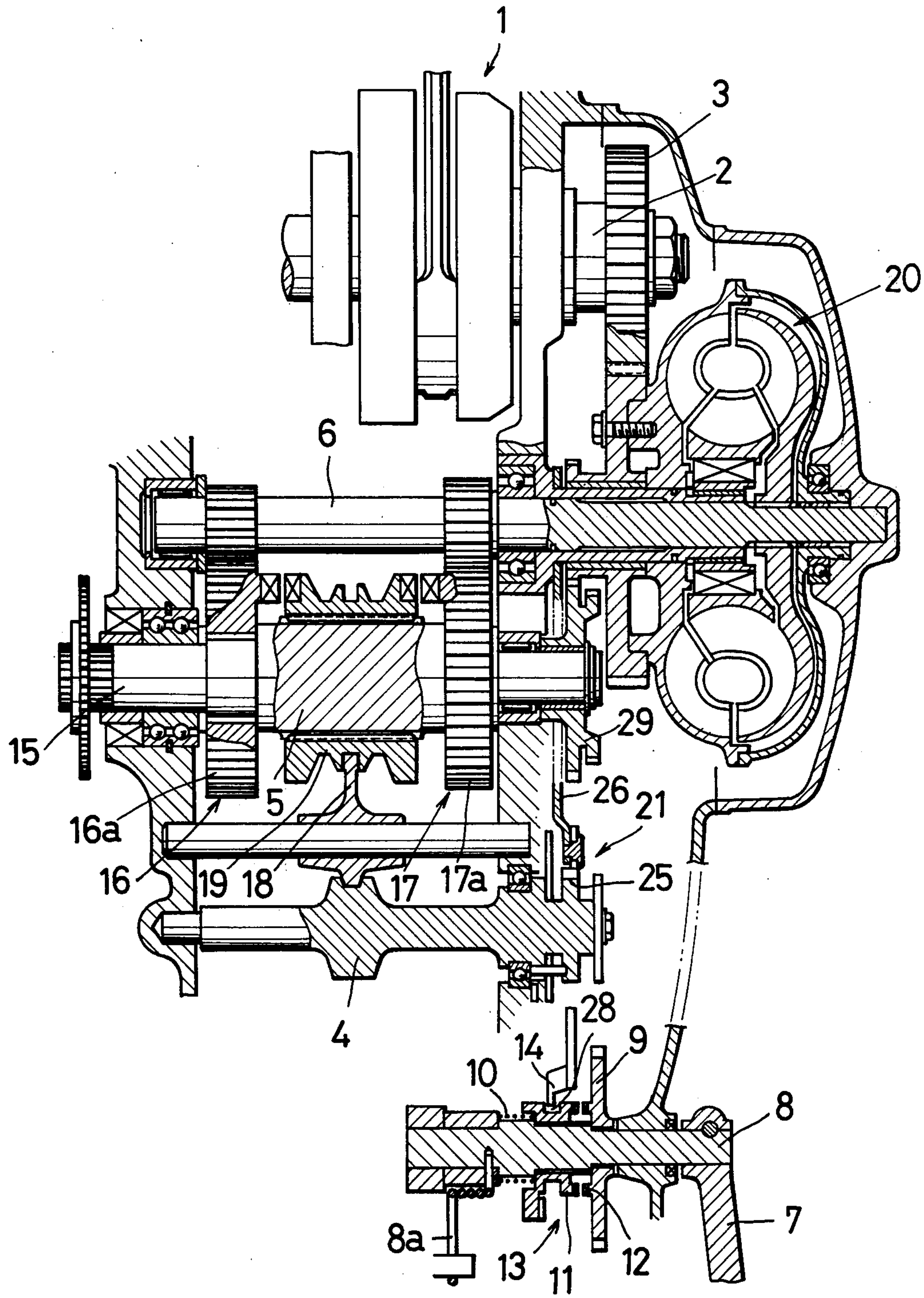
FIG. 1 is a partial front sectional view of one embodiment according to this invention.

The drawings show a safety arrangement for a kickstart apparatus for an internal combustion engine 1 wherein a driving gear 3 mounted on a crank shaft 2 of the internal combustion engine 1 is in driving connection with a driving shaft 6 at an input side of a power transmission 5. The transmission 5 can be changed over between at least three stages inclusive of high speed, low speed and neutral by rotation of a shift drum 4. The shaft 6 is additionally connected in parallel with this connection to a starting gear 9 mounted on a starting shaft 8 having a kick pedal 7 at an end thereof. The gear 9 and the shaft 8 are interconnected through a clutch 13 comprising a movable half portion 11 and a stationary half portion 12 which are arranged to be engaged by the action of a spring 10 on turning of the shaft 8. An engaging claw 14 which can be engaged with the movable half portion 11 is mounted outside the movable half portion 11, and the engaging claw 14 is so arranged that, by the operation of a detecting means 21 for detecting changeover positions of the shift drum 4, the claw 14 can be moved to advance and retreat.

The transmission 5 comprises the driving shaft 6 on its input side and a driven shaft 15 on the output side in parallel with the shaft 6, and there are provided on the two shafts 6, 15 a low speed gear train 16 on one side and a high speed gear train 17 on the other side. In this case, each gear train is of an ordinarily meshed type and respective gears **16*a*, 17*a*, on the driven sides are loosely mounted on the driven shaft 15, and a shifter 19 is mounted on shaft 15 and is slidable to the right and left by the shift drum 4 through the action of a shift fork 18 mounted between the two gears 16*a*,17*a*, so that by left and right movements of the shifter 19 the low speed gear train 16 and the high speed gear train 17 can be selected respectively while in the middle position neither of the two trains 16,17 is selected. Thus the transmission 5** can be changed over as desired to any of three stages of high speed, low speed and neutral.

Additionally, in the illustrated embodiment, the driving shaft 6 on the input side is extended in one lateral direction and is provided at its extended end portion with a torque convertor 20, so that the shaft 6 can be driven by the driving gear 3 through the convertor 20.

The starting gear 9 is loosely and rotatably mounted on the starting shaft 8, and is connected to the driving gear 3 through a gear train including an intermediate gear 29 loosely mounted on the end portion of the driven shaft 15. The two half portions 11, 12 of the clutch 13 are both located on the starting shaft 8, and as shown clearly in FIGS. 2 and 3 the movable half portion 11 is normally engaged, by a laterally projecting arm member **11*a* thereof, with a stationary stopper 11*b* provided outside the same, so that, only when the half portion 11 is turned in one direction by the starting shaft 8 will the arm member 11*a* be released from engagement with the stopper 11*b* and as a result the half portion 11 is allowed to advance by the action of the spring 10. In addition, the starting shaft 8 carries at its other end portion a return spring 8*a***.

The shift drum 4 is so arranged that drum 4 may be given a step feed rotation by a shift arm 22 connected to a shift pedal and is stopped at respective changeover rotary positions by means of a stopper cam 23, which is secured to the outer end of the shaft of the drum 4, and a stopper arm 24 engaged therewith.

Figure 2:
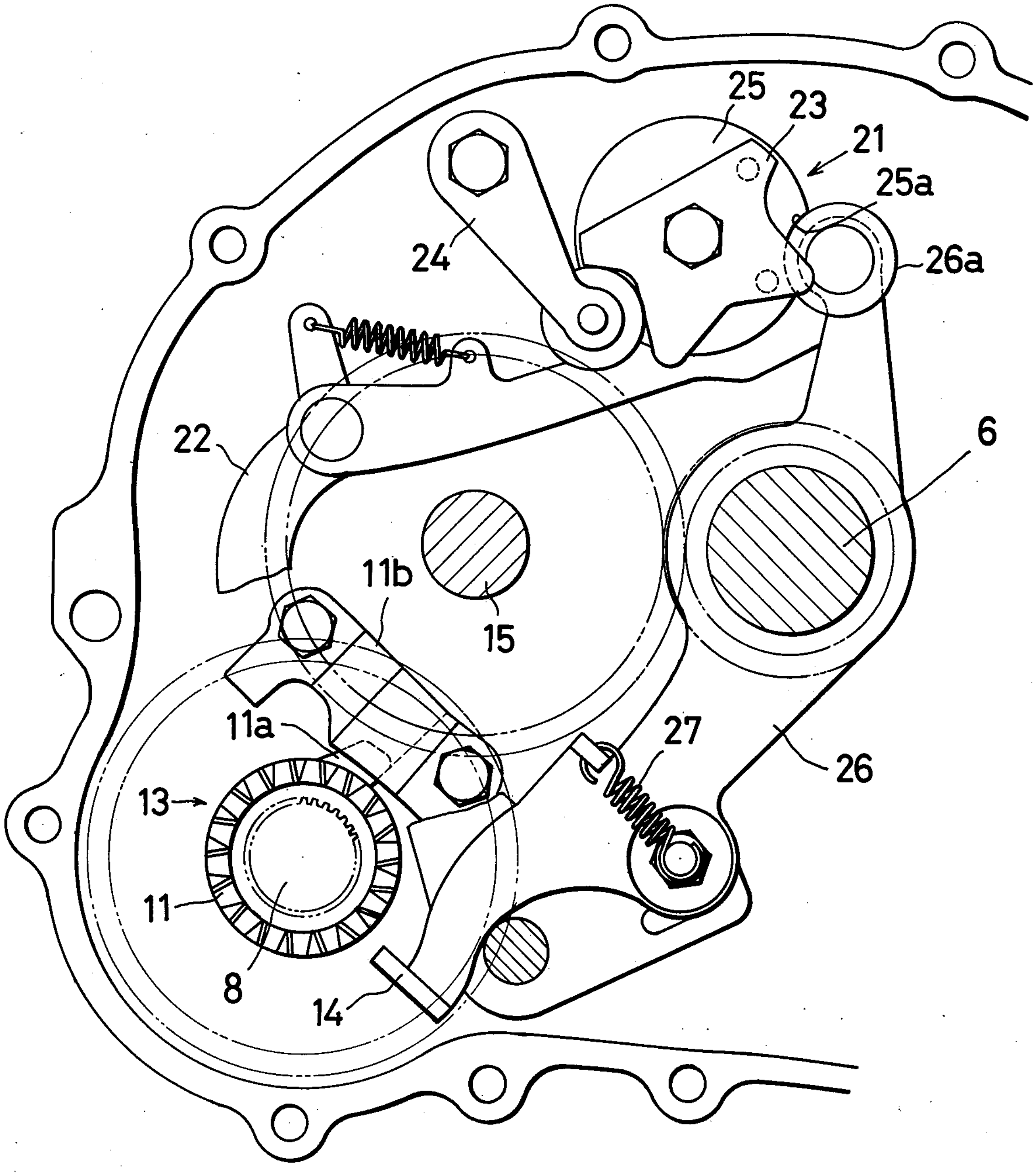
FIGS. 2 and 3 are enlarged elevational views showing the operation of a major portion of the embodiment of FIG. 1 in two different conditions of operation.
Figure 3:
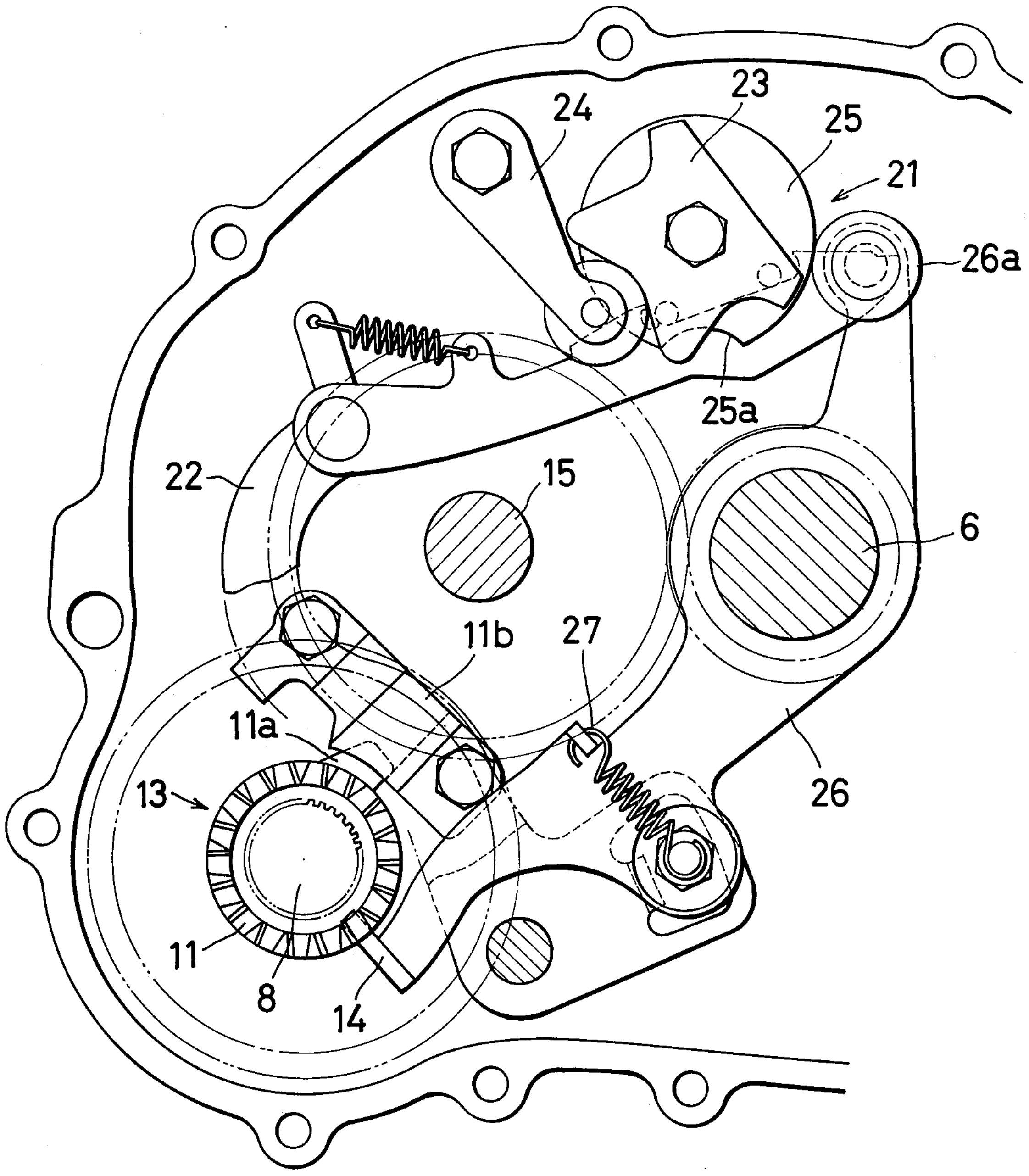

The detecting means 21 comprises a circular cam 25, which is secured to the outer end of the shaft of the drum 4 and has at one position of the periphery thereof a recess portion **25*a*, and a swingable follower lever 26 which is in engagement with the recess portion 25*a* by means of roller 26*a* provided on one end thereof, the lever 26 being urged in pressure contact with the cam 25 by the action of a spring 27 acting on the middle portion thereof. At the other end of the lever 26, the engaging claw 14 is formed as a bent portion to project from the lever 26 to face a groove 28 formed in the periphery of the movable half portion 11, so that by the rotation of the cam 25 caused by rotation of the drum 4, the lever 26 follows the cam to rock back and forth, and thereby the engaging claw 14 advances and retreats in relation to the groove 28. More in detail, the cam 25 has the foregoing recess portion 25***a* at a position corresponding to such a rotary position of the drum 4 in which the transmission 5 is at its neutral stage, so that when the drum 4 is at its rotary position of the neutral stage, the lever 26 is rocked forwardly in the counter-clockwise direction, as shown in FIG. 2, and in accordance therewith the engaging claw 14 is out of the groove 28, so that the half portion 11 of clutch 13 is released from engagement therewith. In contrast when the drum 4 is at any other position than neutral, that is, at the high speed position or the low speed position, the lever 26 is pushed by the cam 25 to rock backwardly in the clockwise direction as shown in FIG. 3, and accordingly the engaging claw 14 enters groove 18, so that the half portion 11 is prevented from advancing. The lever 26 is loosely mounted on the driving shaft 6 in order to be rocked around the shaft 6.

The operation of the apparatus is as follows:

When the transmission 5 is changed over to its high speed stage or low speed stage by rotation of the shift drum 4, the circular cam 25 and the follower lever 26 constituting the detecting means 21 for detecting the above position are brought into the condition as shown in FIG. 3. That is, the lever 26 is pushed by the cam 25 to rock to the right in the drawing, and thereby the engaging claw 14 on the other end of the lever 26 is brought into engagement with the half portion 11 of the clutch 13, whereby the clutch 13 can not be engaged even by rotation of the starting shaft 8 produced by actuating the kick pedal 7. In other words, the engine 1 can not be driven in rotation from the starting shaft 8 and as a result no starting operation can be made. If, however, the transmission 5 is then changed over to its neutral stage by rotation of the drum 4, the circular cam 25 and the follower lever 26 constituting the detecting means 21 are brought into the condition as shown in FIG. 2, i.e. a condition in which the lever 26 is rocked in the other direction whereby the engaging claw 14 on the other end of lever 26 is released from engagement with the half portion 11, and thus the clutch 13 is closed by the rotation of the starting shaft 8 caused by the kick pedal 7, so that the rotation of the shaft 8 is transmitted to the engine 1.

Thus, according to this invention, only when the transmission 5 is changed over to its neutral stage will the rotation of the starting shaft 8 caused by the kick pedal 7 be transmitted to the engine 1 for starting the engine. In any other cases than the neutral stage the foregoing connection can not be completed so that the danger caused by starting of the engine 1 when the transmission 5 is at its high speed or low speed stages and an unintentional starting in the case of a vehicle, can be eliminated. The apparatus is simple in construction and can be manufactured economically because it is sufficient that the engaging claw 14 be arranged to move in accordance with the detecting means 21 to advance and retreat.

What is claimed is:

1. An improved safety arrangement in a kickstart apparatus for an internal combustion engine having a driving gear connected to a driving shaft at an input side of a power transmission, a shift drum being provided to shift the transmission between high speed, low speed and neutral stages by rotation of the shift drum, a starting gear connected to said driving gear in parallel with the driving shaft, a starting shaft loosely supporting the starting gear, a kick pedal on said starting shaft and clutch means interconnecting the starting gear and starting shaft comprising a movable half portion, a stationary half portion and spring means for engaging the clutch half portions upon rotation of the starting shaft, the improvement comprising: engaging claw means engageable with the movable half portion to arrest the same, and detecting means for detecting the positions of the shift drum corresponding to the stages of the transmission for selectively moving the claw means into engagement and disengagement with the movable half portion of the clutch means, said detecting means comprising, a pivotal lever movable by the shift drum, said claw means being integral with the lever; cam means coupled in rotation with the shift drum for moving the pivotal lever between a first position in which the claw means is disengaged from the movable half portion of the clutch means and a second portion in which the claw means is engaged with the movable half portion of the clutch means; and a roller on said pivotal lever engaged with said cam means.

2. The improvement as claimed in claim 1 wherein said cam means comprises a cam having a recess for receiving said roller on the pivotal lever for displacement of said lever.

3. The improvement as claimed in claim 2 comprising feed means for imparting step feed rotation of said shaft drum to shift the transmission, and shift pedal means coupled to the feed means for operating the same.

4. The improvement as claimed in claim 2 comprising abutment means on said movable half portion of the clutch means for preventing engagement of the movable half portion of the clutch means with the stationary half portion with the starting shaft in initial position, said abutment means being rotatable upon rotation of said starting shaft from said initial position to release the movable half portion of the clutch means.

* * * * *